(12) United States Patent
Omori (10) Patent No.: US 9,584,746 B2
(45) Date of Patent: Feb. 28, 2017

(54) IMAGE PROCESSING DEVICE AND IMAGING METHOD FOR OBTAINING A HIGH RESOLUTION IMAGE AND EFFICIENT SPEED FOR A FEEDBACK CONTROL SIGNAL

(71) Applicant: Sony Corporation, Tokyo (JP)

(72) Inventor: Kenji Omori, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 182 days.

(21) Appl. No.: 13/910,774

(22) Filed: Jun. 5, 2013

(65) Prior Publication Data

US 2014/0362269 A1    Dec. 11, 2014

(51) Int. Cl.
| | |
|---|---|
| *H04N 5/378* | (2011.01) |
| *H04N 5/345* | (2011.01) |
| *H04N 5/235* | (2006.01) |
| *H04N 9/04* | (2006.01) |
| *H04N 9/07* | (2006.01) |

(52) U.S. Cl.
CPC ............ *H04N 5/378* (2013.01); *H04N 5/235* (2013.01); *H04N 5/345* (2013.01); *H04N 9/045* (2013.01); *H04N 9/07* (2013.01)

(58) Field of Classification Search
CPC .... H04N 5/23293; H04N 5/378; H04N 5/374; H04N 5/235; H04N 5/345; H04N 9/045; H04N 9/07
See application file for complete search history.

(56) References Cited

U.S. PATENT DOCUMENTS

| | | | | |
|---|---|---|---|---|
| 4,528,595 | A * | 7/1985 | Eouzan ................ | H04N 3/1575 257/443 |
| 7,880,786 | B2 * | 2/2011 | Muramatsu .............. | H04N 3/15 348/294 |
| 2002/0186312 | A1 * | 12/2002 | Stark ...................... | H04N 5/345 348/302 |
| 2006/0170780 | A1 * | 8/2006 | Turley et al. .............. | 348/208.1 |
| 2006/0170790 | A1 * | 8/2006 | Turley et al. .............. | 348/229.1 |
| 2006/0284993 | A1 * | 12/2006 | Turley et al. .............. | 348/229.1 |
| 2007/0046809 | A1 * | 3/2007 | Nakamura .................... | 348/362 |
| 2007/0223904 | A1 * | 9/2007 | Bloom et al. ................. | 396/100 |
| 2008/0084486 | A1 * | 4/2008 | Enge et al. .................... | 348/239 |
| 2009/0086084 | A1 * | 4/2009 | Komaba ................ | G03B 13/18 348/349 |
| 2009/0153694 | A1 * | 6/2009 | Takayama ............. | G06T 3/4053 348/222.1 |
| 2009/0153711 | A1 * | 6/2009 | Lee .............................. | 348/302 |
| 2009/0213244 | A1 * | 8/2009 | Seo et al. .................... | 348/230.1 |

(Continued)

*Primary Examiner* — Dennis Hogue
(74) *Attorney, Agent, or Firm* — Oblon, McCelland, Maier & Neustadt, L.L.P.

(57) ABSTRACT

An image processing apparatus that comprises a plurality of read out rows in an imaging unit of the apparatus. The imaging region comprises of a plurality of pixels which are equipped with color filters of the red, blue and green type. The apparatus comprises a controller configured to set a frame rate for a first row scanning unit and a second frame rate for a second row scanning unit. The apparatus is further configured to perform image interpolation and perform the auto focus, auto exposure, auto black white or the like functions and display an image with a high resolution on a display unit.

15 Claims, 6 Drawing Sheets

(56) References Cited

U.S. PATENT DOCUMENTS

2009/0244350 A1\* 10/2009 Wada ............................ 348/311
2009/0251575 A1\* 10/2009 Wada ............................ 348/294
2011/0074997 A1\* 3/2011 Border et al. ................ 348/311
2012/0314095 A1\* 12/2012 Fukui ........................ 348/220.1

\* cited by examiner

IMAGE PROCESSING DEVICE AND IMAGING METHOD FOR OBTAINING A HIGH RESOLUTION IMAGE AND EFFICIENT SPEED FOR A FEEDBACK CONTROL SIGNAL

BACKGROUND

Field of the Disclosure

The present disclosure relates to a terminal device provided with an image pick-up element that performs line exposure of a CMOS (Complementary Metal Oxide Semiconductor Image Sensor) sensor, and an imaging method for the terminal device.

Description of the Related Art

Mobile devices, such as smart phones and tablets are examples of devices that are adapted to display an image on a display panel disposed thereon the device.

Conventionally, when displaying images on such devices, the preview mode depicts the image captured by an image pick-up element of the device. The raw image data (hereinafter referred to as simply as raw data) captured by the pick-up element is not preserved (saved) in a memory module but rather directly transferred to the display unit of the device. In such scenarios, it is not uncommon for the resolution of the display unit to be lower than the resolution of the raw data captured by the image pick-up element. Thus a process commonly referred to as "thinning-out" is performed while displaying an image on the display screen, wherein the pixels of the raw data captured by the pick up element are reduced in resolution (in the row and/or column direction) and outputted to the display unit.

Commonly used functions with such devices are Auto Exposure (AE), Auto White Balance (AWB), Auto Focus (AF) and the like. While executing such functions, it is desirable to employ a control unit within the device that is configured to generate statistical data from the raw data captured by the image pick-up element in a fast manner. However, when the generation and transfer of raw data for a statistical data generation occurs in a certain time period (wherein the generation and transfer of the raw data occurs from the image pick-up element to the display unit), the response speed of a control loop cannot be made faster than the time-period. Note that if the thinning rate of the raw data transferred to a control unit from the image pickup element is made higher, a higher frame rate and a higher speed of operation for the control loop can be achieved. However, in doing so, the resolution of the image displayed on the display becomes very low.

Accordingly, the objective of the present disclosure is to achieve at least two different frame rates while ensuring that the resolution of the image is not compromised.

SUMMARY

Devices and methods for processing an image are discussed herein. One aspect of the present disclosure is focused on displaying a high-resolution image while obtaining an efficient speed for a feedback control signal. Further, the image quality in a preview mode can be improved by performing an interpolation process of a low rate data stream with that of a high rate data stream.

According to one exemplary embodiment, the disclosure is directed to an image processing apparatus that comprises an image sensor including a plurality of read out rows each including a plurality of pixels arranged in a horizontal direction, a first row scanning circuit configured to read a first plurality of the plurality of read out rows at a first frame rate, a second row scanning circuit configured to read a second plurality of the plurality of read out rows at a second frame rate that is different from the first frame rate, and a display that displays an image generated based on data read by at least one of the first and second row scanning circuits.

According to another exemplary embodiment, the disclosure is directed to a method performed by an image processing apparatus, the method comprising reading, at a first frame rate, a first plurality of read out rows of an image sensor including a plurality of read out rows each including a plurality of pixels arranged in a horizontal direction, reading a second plurality of the plurality of read out rows at a second frame rate that is different from the first frame rate, and displaying an image generated based on data read from at least one of the first and second plurality of read rows.

According to another exemplary embodiment, the disclosure is directed to a non-transitory computer-readable medium including computer program instructions, which when executed by an information processing apparatus, causes the information processing apparatus to perform a process comprising: reading, at a first frame rate, a first plurality of read out rows of an image sensor including a plurality of read out rows each including a plurality of pixels arranged in a horizontal direction, reading a second plurality of the plurality of read out rows at a second frame rate that is different from the first frame rate, and displaying an image generated based on data read from at least one of the first and second plurality of read rows.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1:
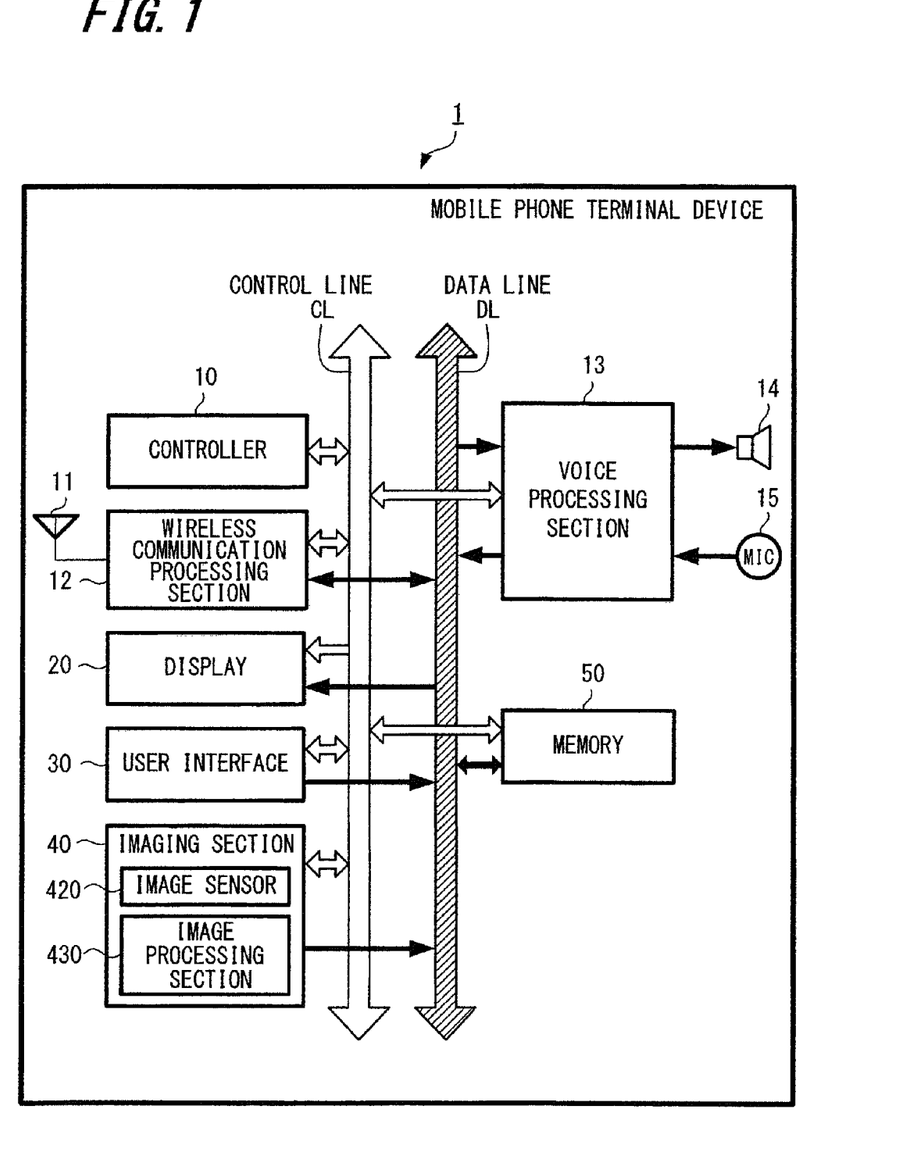
FIG. 1 illustrates schematically an exemplary mobile phone terminal device.

FIG. 1 illustrates a schematic block diagram of an exemplary mobile phone terminal device 1. As shown in FIG. 1, the mobile phone terminal device 1 may include an antenna 11 and a wireless communication processing section 12. The wireless communication processing section 12 may communicate wirelessly via radio signals, or the like, with other mobile devices via, e.g., a base station. Further, a data signal, such as a voice transmission from another user, may be received by antenna 11 and sent to the wireless communication processing section 12 for further processing. In the case of an incoming voice transmission, the voice data signal may be sent from the wireless communication processing section 12 to a voice processing section 13. Incoming voice data received by the voice processing section 13 via the wireless communication processing section 12 may be output as sound via a speaker 14.

Conversely, an outgoing voice signal may be supplied by a user to the voice processing section 13 via a microphone 15. The voice signal received via microphone 15 and processed by the voice processing section 13 may be sent to wireless communication processing section 12 for transmission by the antenna 11.

The mobile phone terminal device 1 includes a display unit 20. The display 20 may be, for example a liquid crystal display (LCD) panel, an organic electroluminescent (OLED) display panel, a plasma display panel, or the like. The display 120 may display text, an image, a web page, a video, or the like. For example, when the mobile phone terminal device 1 connects with the Internet, the display 20 may display text and/or image data which is transmitted from a web server in Hyper Text Markup Language (HTML) format and displayed via a web browser. The display 20 may additionally display data stored in a memory 50.

A user interface (UI) unit 30 comprises a touch panel which includes of a plurality of operation buttons. The UI generates an operational signal based on the operation intended by the user and transfers the signal to a control unit 10. For example a shutter release operation which indicates an image timing with the imaging unit (discussed below) may be contained in the UI.

An imaging unit 40 comprises an image pick-up element (depicted as an image sensor 420) that includes a CMOS sensor and a image processing unit 430. The image pick-up element 420, photo-electrically converts the to-be-photographed object captured by a lens and generates the image raw data. From the raw data obtained by the pick up element 420, the image processing unit 430 generates statistical data and produces control signals for the AE, AWB and AF control based procedures. For example, the control signal for the AF may include an exposure control signal (for controlling the exposure time), an aperture time, and a lens move signal which drives the lens associated with the image pick-up element 420. Further note that the processing unit performs a predetermined digital signal processing of the image, a compression-expansion process or the like on the raw data obtained from unit 420.

The control unit 10 controls each part of the mobile phone terminal device 1 based on the data detected by the user interface 30. The control unit also supervises the thinning of the raw data captured by the image pick-up unit and displays the image on the display panel 20 in preview mode. Further, the raw data acquired for the all the pixels of the image are stored by the control unit in a memory unit 50. The memory 50 may be a random access memory (RAM) or a read only memory (ROM) and may be configured to store the program executed by the control unit 10, the data compressed by the image processing unit 430 or the like. To this end, the memory 50 may be a non-transitory computer readable medium having instructions stored therein for controlling the mobile phone terminal device 1. Further, the controller 110 may include one or more processors for executing the instructions stored on the memory 50.

The mobile phone terminal device 1 includes a control line CL and a data line DL as internal bus lines for communication. The control line CL can be used to transmit control data from the controller 10. The data line DL may be used for the transmission of voice data, display data, or the like, throughout the various elements of the mobile phone terminal device 1.

Figure 2:
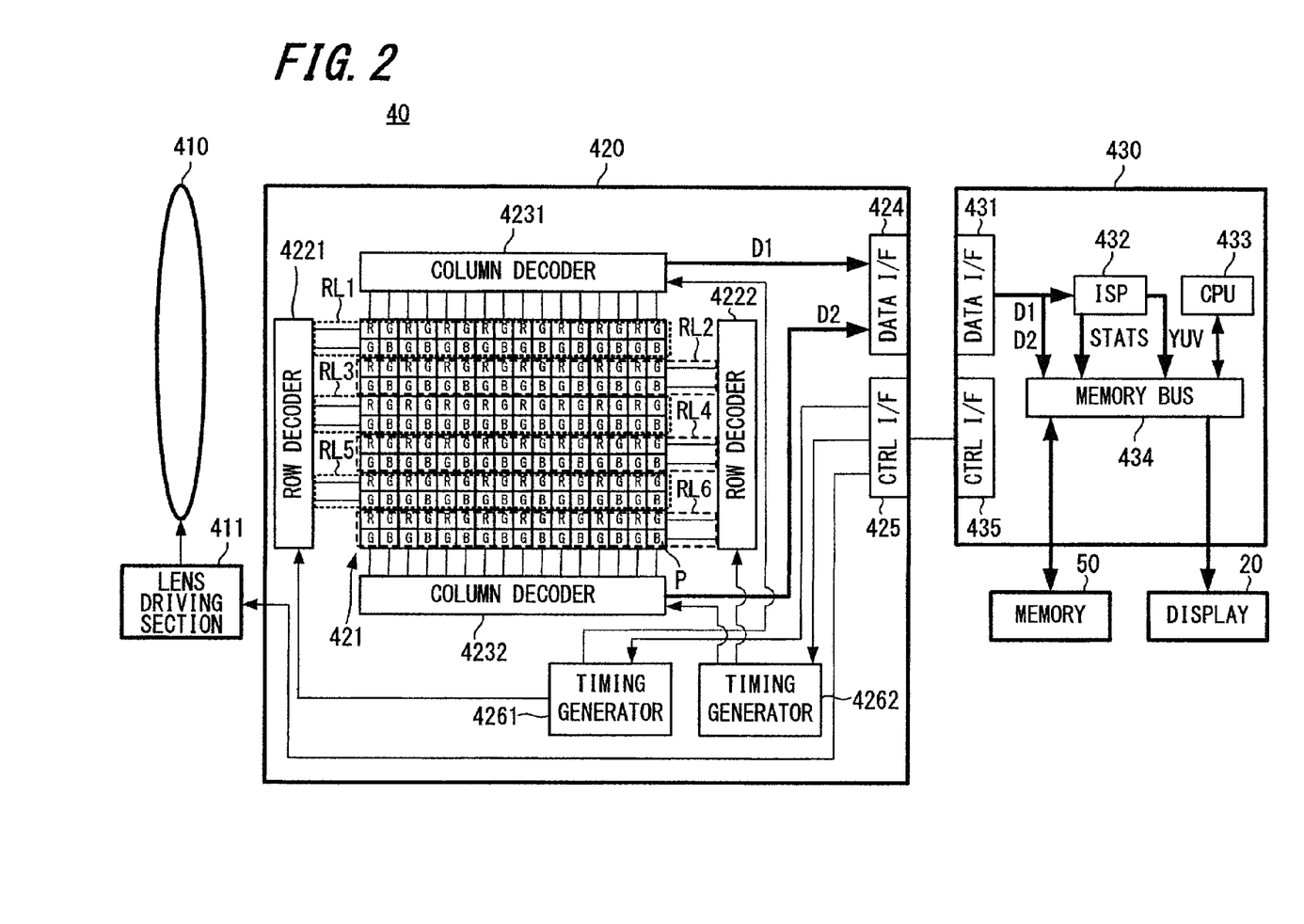
FIG. 2 illustrates the imaging unit of the mobile phone terminal device of FIG. 1 according to one aspect of the disclosure.

FIG. 2 illustrates the structural components of the imaging unit 40 of the terminal device 1. The imaging unit comprises a lens 410, a lens drive part 411, an image pick-up unit 420 and an image processing unit 430. The lens 410 includes a focal length which defines the region of an object that is to be captured by the image pick-up unit 420. The lens drive unit 411 positions the optical axis in the direction of the lens 410.

The image pick-up unit 420 comprises a first line scanning circuit 4221, a second line scanning circuit 4222, a first column scanning circuit 4231 and a second column scanning circuit 4232. The image pick-up unit 420 further comprises a data interface 424, a control interface 425 and timing generators 4261 and 4262 respectively. The imaging region of the image pick-up unit 420 includes a plurality of pixels arranged in a matrix form, wherein each pixel (P) is provided with the color filter of Red (R), Blue (B) and Green (G). Note that in the illustration of FIG. 2, the color filter is presented according to the Bayer system. Specifically, the Bayer system comprises of the colors R and G filters arranged on odd numbered lines and G and B filters arranged on the even numbered lines.

The first line scanning circuit is configured to select the odd numbered lines (rows) of the read out unit line depicted as RL. Note that a read out line is defined as obtaining the signal charges of the R, G and B from the respective lines. Note that a single read out operation comprises the reading of the signal charges from the odd numbered line containing R and G and reading the signal charges from the successive (next) line which contains the G and B. A signal charge accumulated in a pixel P of the selected read out line (RL) is transferred to a column signal line. The second line scanning circuit is configured to select the even numbered line of the read out unit RL. Specifically, the first line scanning circuit 4221 selects the pixels of the odd numbered read out unit lines RL1, RL3, RL5 and so on, and the second line scanning unit 4222 selects the even numbered lines depicted as RL2, RL4, RL6 and so on. In FIG. 2, the lines (rows) read out by the first line scanning unit 4221 are represented by a dotted box and the rows read out by the second line scanning unit 4222 are represented by a bold dotted box. Note that the read out lines read by the respective line scanning circuits are arranges alternately in the imaging region 421.

The first column scanning circuit 4231 is selected by the first row scanning circuit 4221, which transfers raw data D1 including signal electric charge in the form of a column signal. Similarly, the second column selecting circuit 4232 is selected by the second row scanning circuit 4222 and transfers raw data D2. In doing so, a variable period in which raw data D1 is read by the first row scanning circuit 4221 and a variable period when raw data D2 is read by the row scanning circuit 4222 can be obtained.

Data interface (I/F) unit 424 is an interface with which data is exchanged between the image pick-up unit 420 and the image processing unit 430. While transmitting raw data D1 and D2 to the processing unit 430 in the same time-period, the data interface performs an additional function of multiplexing. Multiplexing of the raw data can be performed by methods based on the Mobile Industry Processor Interface (MIPI) specification. The control interface 425 supplies control signals from the image processing unit 430 to the lens drive unit 411, the timing generator 4261 and the timing generator 4262. Examples of such control signals include a lens move signal used in the Auto Focus mechanism wherein the control signal is supplied to lens drive unit 411. On the other hand, while implementing the Auto Exposure function, a control signal may be supplied to the timing generators 4261 and 4261 respectively to control the time-periods of the respective data streams.

The timing generator 4261 and the timing generator 4262 generate a plurality of drive pulses such as a horizontal synchronization signal, a vertical synchronization signal, a electronic shutter pulse or the like. The time-period (frequency) of a pulse is based on various control signals supplied from the control interface 425. Note that as shown FIG. 2, the timing generator 4261 transfers the control signal to the first row scanning unit 4221 and the first column scanning unit 4231, whereas the timing generator supplies the control signal to the second row scanning unit 4222 and the second column scanning circuit 4232.

The image processing unit 430 of the imaging unit may comprise one or more processors which include a central processing unit (CPU), an image signal processor (ISP) and the like, a memory bus 434 that enables communications to the memory unit 50 and the display unit 20 and a control interface unit 432 and a data interface unit 431 that enable communication with the image pick-up unit 420.

The data interface (I/F) 431 supplies the raw data D1 and/or the raw data D2 (which were transferred by the image pick-up unit 420 via its data interface unit 424) to the ISP 432 and/or the memory bus 433. Note that the data interface unit 431 performs a de-multiplexing function when the raw data D1 and D2 are transferred to it in a multiplexed manner by the data interface unit 424. The ISP 432 generates statistical data from the raw data D2 transferred from the image pick-up unit 420. Note that the statistical data represents the value of the color filters in the pixels in a certain area of the imaging region 421. Based on the statistical data generated, the CPU 433 generates an exposure control signal and a lens moving signal. Note that the exposure control signal and a row/column selecting signal is further based on the imaging frame rate (of raw data D1 and raw data D2) which are previously preset by the user through the user interface. Further, the ISP can also be configured to perform a plurality of functions such as converting the image data received from the image pick-up unit to a YUV format, or performing a correction process of optical systems while executing the Auto Exposure process, and converting the image data in JPEG (Joint Photographic Experts Group) in to a YUV format.

Lastly, the image processing unit is also equipped with a memory bus 434 for exchanging various signals between ISP 432, CPU 433, memory unit 50 and the display unit 20.

Figure 3:
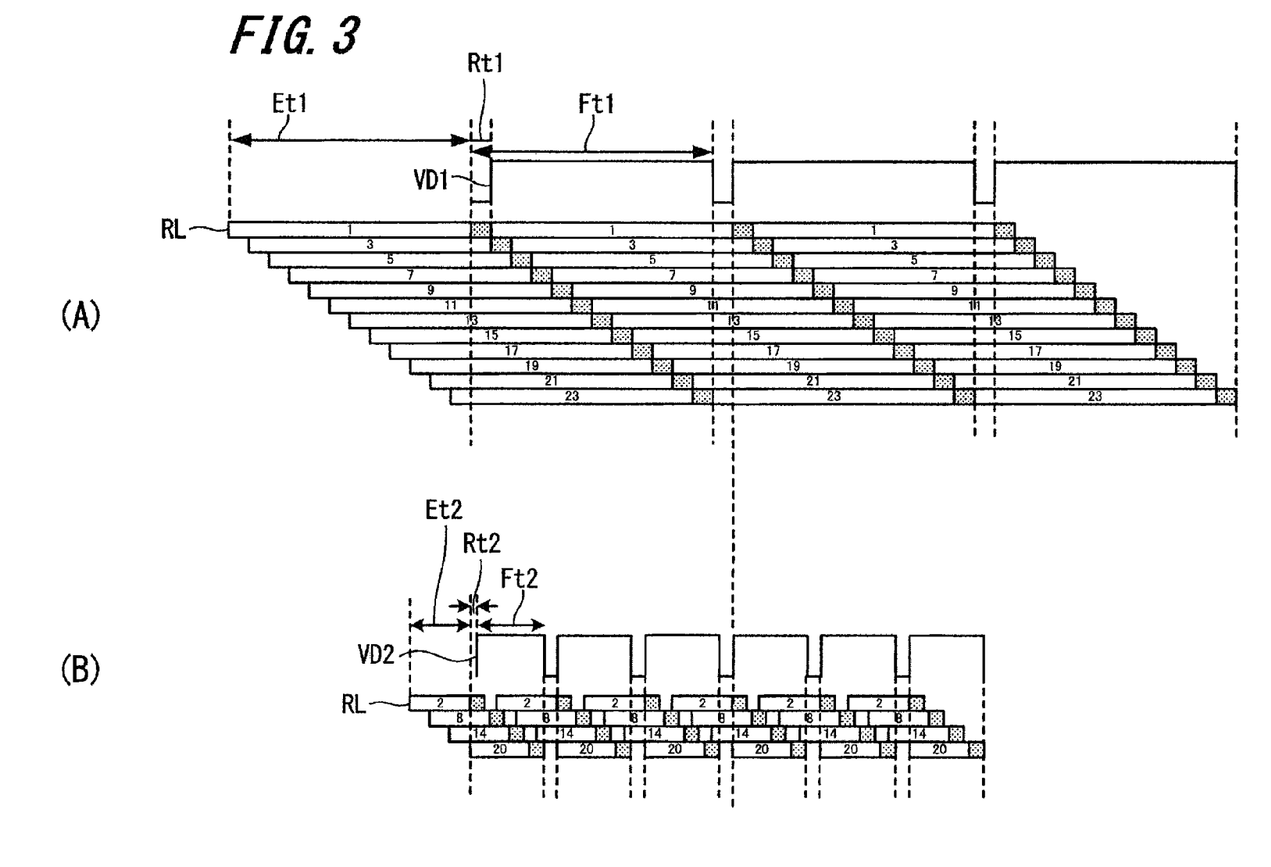
FIG. 3 depicts a timing diagram illustrating the imaging frame rates of different types of data.

FIG. 3 depicts a timing diagram illustrating the difference between the imaging frame rate of raw data D1 and the imaging frame rate of raw data D2. FIG. 3(A) illustrates a non-limiting example of the timing diagram when a read out operation is executed by the first row scanning unit 4221 and the first column scanning unit 4321. Note that in this example, for the sake of simplicity a total of 23 scanning lines is represented. However, in practice one may have more number of lines than those depicted in the figure.

The first line (row) scanning unit 4221 performs a read out operation of each line in to a head. Note that as previously stated, unit 4221 reads out the odd numbered lines. Specifically, the unit 4221 reads out unit line RL of the first line, third line, fifth line, seventh line and so on in a sequential manner. In a certain amount of time referred to as exposure time Et1, a signal charge is accumulated in each pixel that constitutes a read-out. Note that the duration of Et1 is set by an exposure control signal supplied from the CPU 434.

After the completion of the exposure time Et1, the signal charge accumulated in the pixels is read out by the first row scanning circuit 4221 in time Rt1. Reading of the signal charge is conducted in a synchronous manner with respect to a vertical synchronization signal VD1. Note that the read out operation executes in a sequential manner wherein the signal charge accumulated in the pixel are read out until the last read out operation completes. For example, in FIG. 3(A) the operation of read out is completed when the signal charge on read out line RL 23 is completed. Further, the length of the effective frame read out time represented by Ft1 is regulated by the pulse width of the vertical synchronization signal VD1. Once the signal charges are read out a reset operation is executed wherein the storage of signal charge on each of the pixels is started over in a manner described above.

FIG. 3(B) is a timing diagram illustrating the read out operation of raw data D2 by the second row scanning unit 4222 and the second column scanning unit 4232. For the sake of illustration, FIG. 3(B) shows that the second scanning unit performs a read out operation wherein every $6^{th}$ line (row) is read out into a head by the scanning unit. Hence the second scanning unit reads out the second line, eight line, fourteenth line and so on in a sequential manner. Note that as compared to the first scanning unit, which read out every other line (i.e., it read out all the odd rows sequentially), the second scanning unit reads out every sixth row. Hence the resolution of the raw data D2 is one third the resolution of raw data D1. In a manner similar to the first scanning unit, in a certain amount of time referred to as exposure time Et2, a signal charge is accumulated in each pixel is read-out. Note that the duration of Et2 is set by an exposure control signal supplied from the CPU 434. After the completion of the exposure time Et2, the signal charge accumulated in each pixel P is reset and read out by the second scanning unit 4221 in a read out time Rt2. Note that the reading of the signal charge is conducted in a synchronous manner with respect to a vertical synchronization signal VD2. Further, the pulse width of the vertical-synchronization signal VD2 is one third of the vertical-synchronization signal VD1. Therefore the effective frame read out time Ft2 (FIG. 3(B)) is set to be one third of the effective frame read out time Ft1, shown in FIG. 3(A) which implies that while one frame of raw data D1 is read, the raw data D2 is read by three frames. That is, the raw data D2 is produces by three times as many frames as compared to the raw data D1.

It must be appreciated that although the vertical synchronization signals VD1 and VD2 controlled by the CPU 433 in the example illustrated in FIG. 3 are used to execute the read out operations of the first and second scanning units, one may choose to operate each of the scanning units independently in a non-synchronous manner.

Figure 4:
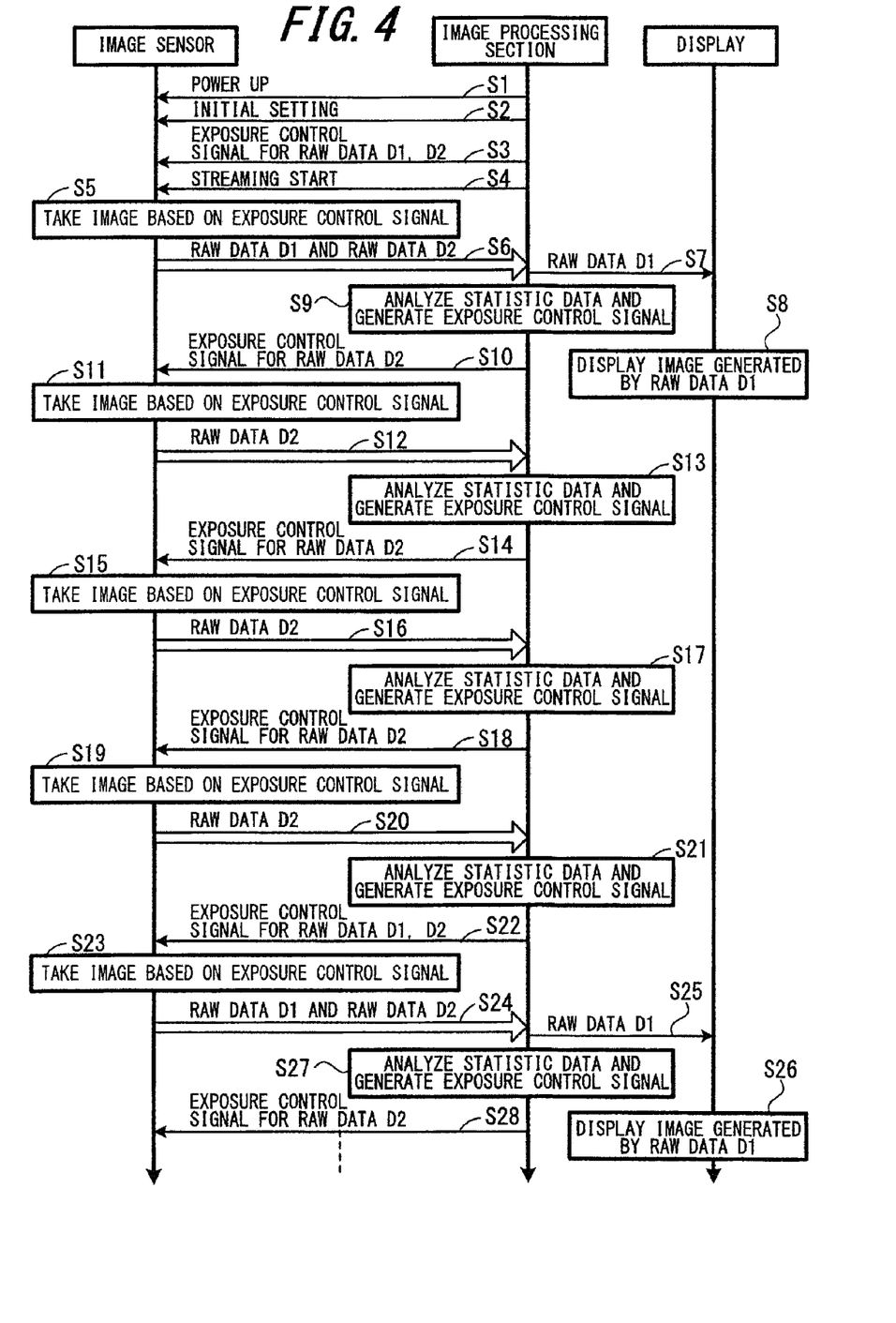
FIG. 4 is flowchart illustrating the steps taken while performing the Auto Exposure process.

FIG. 4 is a non-limiting example of a flowchart depicting the steps of performing an Auto Exposure (AE) function by the apparatus 1. Specifically, FIG. 4 is sequence diagram illustrating the process performed by the image pick-up element 420, image processing unit 430 and the display unit 20.

For the sake of illustration, the frame rate of raw data D1 is considered to be 60 frames per second (FPS) and the data rate of raw data D2 is considered to be 240 FPS. In Step S1 a control turns ON the power supply of the image processing unit 430 which in turn powers the image pick-up element

420. On being activated the image captured by the image pick-up element is displayed on the display unit in the preview mode.

In step S2, the image processing unit 430 performs an initialization (initial setting) of the image pick-up unit 420. In step S3, the exposure control signals for raw data D1 and raw data D2 are transferred from the image processing unit 430 to the image pick-up element 420. Specifically, with regards to the example of FIG. 4, a control signal for transferring the raw data at a frame rate of 60 FPS with respect to the timing generator 4261 which drives the first row scanning unit 4221 and the first column scanning unit 4231 are transferred to unit 420. In a similar manner, a control signal which indicates the transfer rate for raw data D2 to be equal to 240 FPS is transferred to the image pick-up element 420. In step S4, a control signal which indicates a start of the imaging process is transferred to the image pick-up unit 420, which on receiving the control signal performs the imaging process based on the details of the exposure control signals received in step S3.

In step S6, the raw data D1 and D2 are transferred from the image pick-up unit 420 to the image processing unit 430. In step S6, the image processing unit 430 transfers the raw data of D1 to the display unit 20. In step S8, the image from the raw data D1 is displayed on a display panel of display unit 20. Note that a thinning of the frame rate occurs while displaying the data, as it is directly transferred to the display unit. Specifically raw data D1 which is generated at 60 FPS is thinned to rate of 30 FPS before being displayed.

In step S9 an analysis is performed in the image processing unit 430 based on the statistical data generated from the raw data D2 that was captured in step S6. Further, an exposure control signal is generated based on the analysis and is transferred to the image pick-up unit 420 in step S10. In what follows, the communication between the image pick-up unit 420 and the image processing unit 430 with regards to the statistical analysis conducted by unit 430 to generate an exposure control signal based on the raw data D2 is described.

In step S11, the image pick-up element 420 performs imaging based on the exposure control signal for raw data D2 that it received in step S10. In step S12, the raw data D2 is transmitted to the image processing unit 430. Note that the raw data for D2 is generated at 240 FPS as compared to the raw data D1 which is generated at 60 FPS. Hence the raw data D2 is produced faster (by a factor of 3) as compared to the raw data D1. Therefore the resolution of raw data D2 is set to be one third that of D1. In step S13, the image processing unit 430 conducts an analysis using the statistical data generated from the raw data D2 which it receives in step S12. Further, an exposure control signal is generated for raw data D2 which is transmitted to the image pick-up unit 420 in step S14. Note that the steps to calculate the auto exposure for the raw data D2 are repeated in sequence from step S15 to S21.

In step S22, an exposure control signal for raw data D1 and D2 are transmitted to the image pick-up unit 420, wherein after in step S23, the image pick-up unit performs imaging based on the received exposure control signals. In step S24 the raw data D1 and D2 are transferred to the image processing unit 430. In step S25, the image processing unit transfers the raw data D1 to the display unit 20, wherein in step S26 the image generated by the raw data D1 is displayed on a display panel. In step S27, an analysis is conducted using the statistical data generated from the raw data D2 and an exposure control signal based on the conducted analysis is generated.

Finally, in step S28 an exposure control signal for raw data D2 is transmitted to the image pick-up element 420. The above processes continue until a shutter release as initiated by a user is detected by the user interface 30. When a release is detected a control signal which reads all the pixel of the imaging region 421 (by the first and second row/column scanning units) is conducted and the data is saved in memory 50 by the CPU 433.

Figure 5:
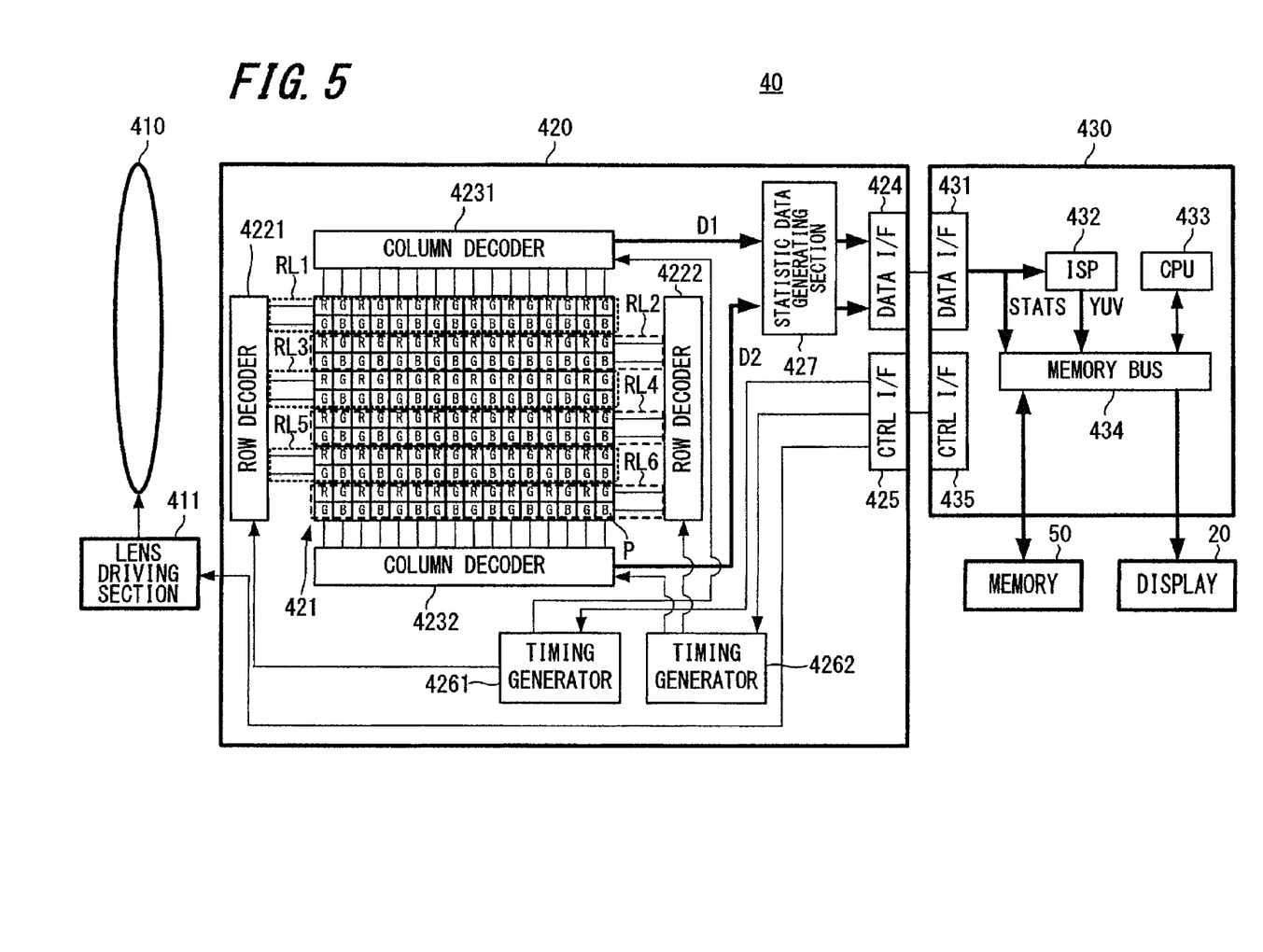
FIG. 5 illustrates the imaging unit of the mobile phone terminal device of FIG. 1 according to another aspect of the disclosure.

FIG. 5 illustrates a modification to the imaging unit of the device 1 according to another aspect of the disclosure. Note that the imaging unit as presented in FIG. 2, includes data interface 424 and a control interface 425. These were used to transmit data and control signals from (to) an image pick-up unit 420 to (from) the image processing unit 430. Note that the data transferred was raw data and the statistical analysis was conducted by the CPU 433, located in the image processing unit 430.

In FIG. 5, an alternate schematic is presented wherein a statistical generating unit 427 is comprised within the image pick-up unit 420. The data transferred to the image processing unit is the statistical data of D1 and D2 and not the raw data captured by the imaging unit. In this manner, the communication between the image pick-up element and the image processing unit can be made more efficient.

Figure 6:
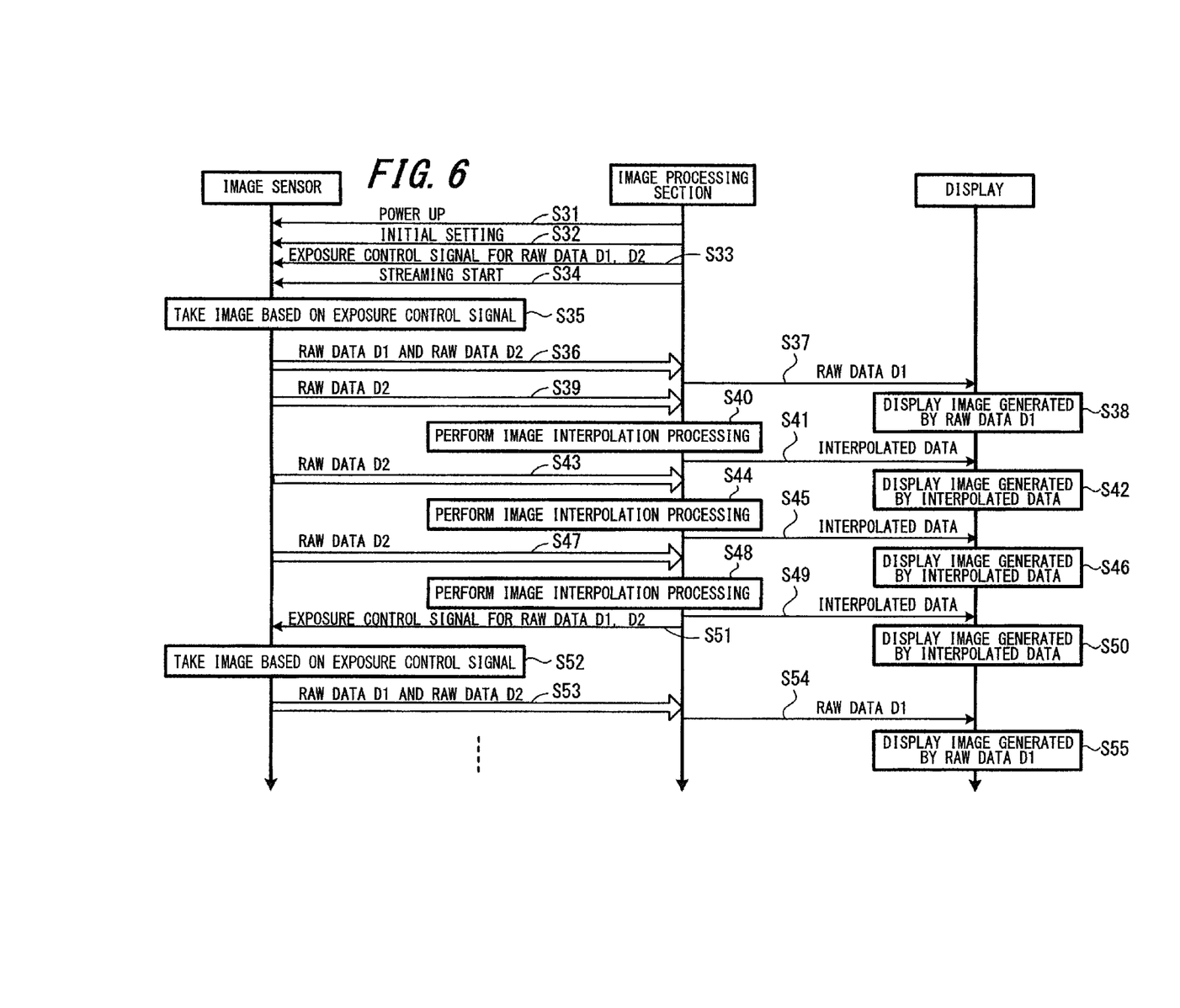
FIG. 6 illustrates an exemplary flowchart depicting the interpolation method used to generate the image.

FIG. 6 illustrates an exemplary flowchart depicting an interpolation method used to generate the image. Note that the raw data of D2 can be displayed directly on the display unit 20. However, in doing so the resolution of the image is lowered as the resolution of the raw data D2 is low. Hence, FIG. 6 illustrates a technique wherein a high resolution image is displayed on the display unit 20 using the high-resolution data of D1 and interpolating the raw date D2 of low resolution.

As considered in FIG. 4, for the sake of illustration, the frame rate of raw data D1 is considered to be 60 frames per second (FPS) and the data rate of raw data D2 is considered to be 240 FPS. In Step S31 a control turns ON the power supply of the image processing unit 430 which in turn powers the image pick-up element 420. On being activated the image captured by the image pick-up element is displayed on the display unit in the preview mode.

In step S32, the image processing unit 430 performs an initialization (initial setting) of the image pick-up unit 420. In step S33, the exposure control signals for raw data D1 and raw data D2 are transferred from the image processing unit 430 to the image pick-up element 420. Specifically, with regards to the example of FIG. 6, a control signal for transferring the raw data at a frame rate of 60 FPS with respect to the timing generator 4261 which drives the first row scanning unit 4221 and the first column scanning unit 4231 are transferred to unit 420. In a similar manner, a control signal which indicates the transfer rate for raw data D2 to be equal to 240 FPS is transferred to the image pick-up element 420. In step S34, a control signal which indicates a start of the imaging process is transferred to the image pick-up unit 420, which on receiving the control signal performs the imaging process in step S35 based on the details of the exposure control signals received in step S33.

In step S36, the raw data D1 and D2 are transferred from the image pick-up unit 420 to the image processing unit 430. In step S37, the image processing unit 430 transfers the raw data of D1 to the display unit 20. In step S38, the image from the raw data D1 is displayed on a display panel of display unit 20. Further in step S39, the raw data of D2 is transferred from the image pick-up unit 420 to the image processing unit 430. In what follows, the recursive steps taken by the processing unit to perform an interpolation process to display the data generated on the display unit 20 is explained.

In step S40, the image processing unit 430 performs an interpolation process of the raw data D2 using the raw data D1 transmitted (in step S36) from the image pick-up unit 420. An interpolation process is realizable, for example by using the following method: First, among the high resolution images of the raw data D1, a motion vector extracts the position which is detected to comprise the motion of a large object and deletes that part. Secondly, the raw data D2 which detects the same position (motion of a large object) inserts data wherein the raw data of D1 was deleted.

After performing interpolation, the data is transmitted to the display unit 20 in step S41, wherein it is eventually displayed as depicted in step S42. In step S43 the raw data D2 is transmitted from the image pick-up unit to the image processing unit 430 and the cycle of performing interpolation by the image processing unit 430 and further transferring the interpolated data to the display unit 20 is repeated as shown in steps S44-S50. In step S51, an exposure control signal for raw data D1 and D2 are transmitted to the image pick-up unit 420, wherein after in step S52, the image pick-up unit performs imaging based on the received exposure control signals. In step S53 the raw data D1 and D2 are transferred to the image processing unit 430. In step S54, the image processing unit transfers the raw data D1 to the display unit 20, wherein in step S55 the image generated by the raw data D1 is displayed on a display panel.

Note that in the above described process once the interpolation of low resolution raw data D2 with the high resolution raw data D1 was performed, one may opt to store the data after interpolation an a memory unit 50. In doing so, the resolution of the image can be up scaled.

Obviously, numerous modifications and variations of the present invention are possible in light of the above teachings. It is therefore to be understood that within the scope of the appended claims, the invention may be practiced otherwise than as specifically described herein. For example, a second antenna (not shown in the figure) may optionally be supplied for use with a short distance wireless communication processing section. The short distance wireless communication processing section may communicate wirelessly with other devices over a network, such as the Internet, a local area network (LAN), or a wide area network (WAN). The second antenna may for example be a Wi-Fi transceiver.

Further, the examples illustrated in the disclosure consider a frame rate for the raw data D1 to be set to 60 FPS and the frame rate for raw data D2 to be set to 240 FPS. Note that the frame rates are not limited to these specific values. One may choose other values for the frame rate (time-period). Also the examples illustrated in FIGS. 4 and 6 describe the process of conducting the Auto Exposure process. A similar mechanism can be applied to achieve the Auto Focus (AF), Auto White Balance (AWB) or the like processes. Further the color filters associated with the pixels (as describe with reference to FIGS. 2 and 5), in the imaging region were assumed to be of the Bayer system. Any alternate arrangement or sequence of the color filters would be applicable to the processes as described in the disclosure. The present disclosure considers the row and column scanning circuits which comprise a set of two lines for each read out operation. One may envision, a read out operation to comprise of a higher number of lines per scanning operation.

Additionally, devices other than the mobile phone terminal device 1 may be used to perform the features discussed in present disclosure. For example, aspects of the present disclosure may be executed on a smart phone, a tablet, a general purpose computer, a laptop, an electronic reading device, or other such display terminals.

The above disclosure also encompasses the embodiments noted below.

(1) an image pick-up unit that includes an imaging region made from a plurality of read out rows that include a plurality of pixels arranged in a horizontal direction; said read out rows include a first read out unit row and a second read out unit row; said first read out unit row is assigned to a first row scanning unit and a first column scanning unit; said second read out unit row is assigned to a second row scanning unit and a second column scanning unit; said first scanning unit reads the first read out unit row at a first frame rate; said second scanning unit reads the second read out unit row at a second frame rate; and a display unit configured to display an image generated by the first row scanning unit and the second row scanning unit.

(2) The image processing apparatus of (1), wherein the first plurality of the plurality of read out rows and the second plurality of the plurality of read out rows are alternately arranged.

(3) The image processing apparatus of (1), wherein the first plurality of the plurality of read out rows includes red and green color filters arranged sequentially.

(4) The image processing apparatus of (1), wherein the second plurality of the plurality of read out rows includes green and blue color filters arranged sequentially.

(5) The image processing apparatus of (1), wherein the first frame rate is different in magnitude than the second frame rate.

(6) The image processing apparatus of (2), wherein the first plurality of the plurality of read out rows are odd numbered read out rows of the plurality of the read out rows and the second plurality of the plurality of read out rows are even numbered rows of the plurality of read out rows.

(7) The image processing apparatus of (1) wherein the image sensor is a CMOS (Complementary Metal Oxide Semiconductor) sensor.

(8) The image processing apparatus of (1), further comprising: a first timing generator configured to generate a first drive pulse to set the first frame rate for the first row scanning circuit, and a second timing generator configured to generate a second drive pulse to set the second frame rate for the second row scanning circuit.

(9) The image processing apparatus of (1), further comprising: image processing circuitry including at least one of a processor, a memory unit, a control interface and a data interface.

(10) The image processing apparatus of (1), further comprising an image processing circuitry configured to generate statistical data based on raw data output by the first and second row scanning circuits.

(11) The image processing apparatus of (10), wherein, the image processing circuitry is configured to generate an exposure control signal by analyzing the statistical data.

(12) The image processing apparatus of (5), wherein the first frame rate is a frame rate that corresponds to a high resolution data and the second frame rate is higher than the first frame rate and corresponds to a low resolution data.

(13) The image processing apparatus of (12), further comprising an image processing circuitry configured to control a display to display data corresponding to the high resolution data output by the first row scanning circuit.

(14) The image processing apparatus of (12), further comprising an image processing circuitry configured to generate an exposure control signal based on the low resolution data output by the second row scanning circuit.

(15) The image processing apparatus of (12), further comprising an image processing circuitry configured to control a display to display data corresponding to the high resolution data and the low resolution data output by the first and second row scanning circuits.

(16) The image processing apparatus of (15), wherein the image processing circuitry is configured to increase a resolution of the low resolution data by performing image interpolation based on the high resolution data.

(17) An information processing method performed by an information processing apparatus, the method comprising: reading, at a first frame rate, a first plurality of read out rows of an image sensor including a plurality of read out rows each including a plurality of pixels arranged in a horizontal direction, reading a second plurality of the plurality of read out rows at a second frame rate that is different from the first frame rate, and displaying an image generated based on data read from at least one of the first and second plurality of read rows.

(18) A non-transitory computer-readable medium including computer program instructions, which when executed by an information processing apparatus, cause the information processing apparatus to perform a process, the process comprising: reading, at a first frame rate, a first plurality of read out rows of an image sensor including a plurality of read out rows each including a plurality of pixels arranged in a horizontal direction;

reading a second plurality of the plurality of read out rows at a second frame rate that is different from the first frame rate; and displaying an image generated based on data read from at least one of the first and second plurality of read rows.

The invention claimed is:

1. An image processing apparatus comprising:
an image sensor including a plurality of read out rows each including a plurality of pixels arranged in a horizontal direction;
a first row scanning circuit configured to read a first plurality of the plurality of read out rows at a first frame rate corresponding to high resolution data;
a second row scanning circuit configured to read a second plurality of the plurality of read out rows at a second frame rate corresponding to low resolution data;
a display that displays an image generated based on data read by at least one of first and second row scanning circuits; and
image processing circuitry configured to increase a resolution of the low resolution data by performing image interpolation based on the high resolution data, wherein
each read out row of the second plurality of the plurality of read out rows is not a part of the first plurality of the plurality of read out rows.

2. The image processing apparatus of claim 1, wherein the first plurality of the plurality of read out rows and the second plurality of the plurality of read out rows are alternately arranged.

3. The image processing apparatus of claim 2, wherein the first plurality of the plurality of read out rows are odd numbered read out rows of the plurality of the read out rows and the second plurality of the plurality of read out rows are even numbered rows of the plurality of read out rows.

4. The image processing apparatus of claim 1, wherein the first plurality of the plurality of read out rows includes red and green color filters arranged sequentially.

5. The image processing apparatus of claim 1, wherein the second plurality of the plurality of read out rows includes green and blue color filters arranged sequentially.

6. The image processing apparatus of claim 1, wherein the image sensor is a CMOS (Complementary Metal Oxide Semiconductor) sensor.

7. The image processing apparatus of claim 1, further comprising:
a first timing generator configured to generate a first drive pulse to set the first frame rate for the first row scanning circuit; and
a second timing generator configured to generate a second drive pulse to set the second frame rate for the second row scanning circuit.

8. The image processing apparatus of claim 1, wherein the image processing circuitry comprises at least one of a processor, a memory, a control interface and a data interface.

9. The image processing apparatus of claim 1, wherein the image processing circuitry is configured to generate statistical data based on raw data output by the first and second row scanning circuits.

10. The image processing apparatus of claim 9, wherein the image processing circuitry is configured to generate an exposure control signal by analyzing the statistical data.

11. The image processing apparatus of claim 1, wherein the image processing circuitry is configured to control the display to display data corresponding to the high resolution data output by the first row scanning circuit.

12. The image processing apparatus of claim 1, wherein the image processing circuitry is configured to generate an exposure control signal based on the low resolution data output by the second row scanning circuit.

13. The image processing apparatus of claim 1, wherein the image processing circuitry is configured to control the display to display data corresponding to the high resolution data and the low resolution data output by the first and second row scanning circuits.

14. An information processing method performed by an information processing apparatus, the method comprising:
reading, at a first frame rate corresponding to high resolution data, a first plurality of read out rows of an image sensor including a plurality of read out rows each including a plurality of pixels arranged in a horizontal direction;
reading a second plurality of the plurality of read out rows at a second frame rate corresponding to low resolution data;
displaying an image generated based on data read from at least one of the first and second plurality of read rows; and
increasing a resolution of the low resolution data by performing image interpolation based on the high resolution data, wherein
each read out row of the second plurality of the plurality of read out rows is not a part of the first plurality of the plurality of read out rows.

15. A non-transitory computer-readable medium including computer program instructions, which when executed by an information processing apparatus, cause the information processing apparatus to perform a process, the process comprising:
reading, at a first frame rate corresponding to high resolution data, a first plurality of read out rows of an image sensor including a plurality of read out rows each including a plurality of pixels arranged in a horizontal direction;

reading a second plurality of the plurality of read out rows at a second frame rate corresponding to low resolution data;

displaying an image generated based on data read from at least one of the first and second plurality of read rows; and increasing a resolution of the low resolution data by performing image interpolation based on the high resolution data, wherein each read out row of the second plurality of the plurality of read out rows is not a part of the first plurality of the plurality of read out rows.

* * * * *